US011343376B1

(12) United States Patent
Van Arkel et al.

(10) Patent No.: US 11,343,376 B1
(45) Date of Patent: May 24, 2022

(54) COMPUTERIZED SYSTEM AND METHOD FOR ROBOCALL STEERING

(71) Applicant: VERIZON PATENT AND LICENSING INC., Basking Ridge, NJ (US)

(72) Inventors: John Hans Van Arkel, Colorado Springs, CO (US); Karl Stang, Manitou Springs, CO (US); Katrina Marie Kutchko, Colorado Springs, CO (US); Jeffrey Allen Haltom, Fishers, IN (US); Lulia Ann Barakat, McKinney, TX (US); Joe B. Thornton, Raleigh, NC (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 17/245,126

(22) Filed: Apr. 30, 2021

(51) Int. Cl.
*H04M 3/436* (2006.01)
*H04M 3/36* (2006.01)

(52) U.S. Cl.
CPC ............ *H04M 3/436* (2013.01); *H04M 3/36* (2013.01)

(58) Field of Classification Search
CPC ................................ H04M 3/436; H04M 3/36
See application file for complete search history.

(56) References Cited

U.S. PATENT DOCUMENTS

| 9,203,952 | B2* | 12/2015 | Zhang | H04M 3/2227 |
| 10,523,814 | B1* | 12/2019 | Moore | H04M 3/42042 |
| 2004/0022383 | A1* | 2/2004 | Duncan | H04M 3/5158 |
| | | | | 379/265.01 |
| 2007/0124246 | A1* | 5/2007 | Lawyer | G06Q 10/00 |
| | | | | 705/50 |
| 2015/0172312 | A1* | 6/2015 | Wang | H04L 63/1416 |
| | | | | 726/23 |
| 2021/0014355 | A1* | 1/2021 | Quilici | H04M 3/2281 |
| 2021/0136200 | A1* | 5/2021 | Li | G10L 17/26 |
| 2021/0273960 | A1* | 9/2021 | Humphrey | G06F 21/577 |

* cited by examiner

*Primary Examiner* — Binh Kien Tieu

(57) ABSTRACT

Disclosed are systems and methods for robocall steering over voice-hosted traffic networks. The disclosed framework provides novel systems and methods for increasing the accuracy and efficiency in tracking, identifying, blocking and preventing robocalls and robocallers. The disclosed systems and methods provide mechanisms for identifying and removing unwanted voice traffic from networks. The disclosed systems and methods analyze voice traffic over a predetermined period of time (e.g., 1 day or 30 days, for example), and leverage this information into a "know your customer" (KYC) score. This score enables incoming calls to be routed, controlled and/or blocked as they are communicated over voice networks.

20 Claims, 4 Drawing Sheets

US 11,343,376 B1

COMPUTERIZED SYSTEM AND METHOD FOR ROBOCALL STEERING

BACKGROUND INFORMATION

Migration of voice communications from Time-Division Multiplexing Switched networks to IP transport has enabled technology synergies, expanded coverage and significant cost reductions. However, the benefits of Voice Over IP (VOIP) can also be exploited by fraudsters and scammers for large scale "robocall" attacks against consumers, enterprises and government organizations. Robocalls, or spam, scam or phishing calls (used interchangeably), have substantially increased over the years. Any and all subscribers are receiving these calls, regardless of their demographic and/or geographical information. These calls have become a nuisance and represent unwanted traffic on telephony systems.

BRIEF DESCRIPTION OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION OF EXAMPLE EMBODIMENTS

Figure 1:
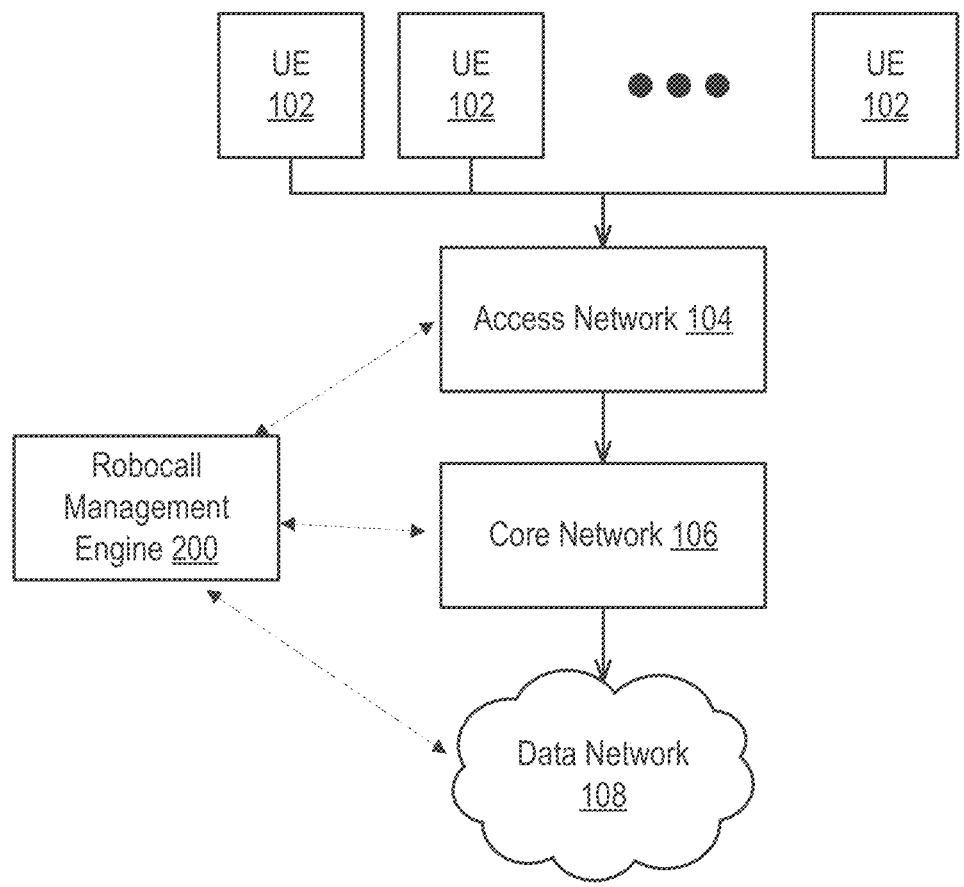
FIG. 1 is a block diagram of an example network architecture according to some embodiments of the present disclosure.

Robocalls, for purposes of this disclosure, in compliance with the definition from the Federal Communication Commission (FCC), include unsolicited spam telephone calls. These calls can be from telemarketing and non-telemarketing parties, and can include a live operator (or speaking party), prerecorded content and/or artificially generated content (e.g., artificial intelligence (AI) voice calls).

Robocalls may also involve caller ID spoofing. Spoofing is the ability for a caller identifier (ID) to be altered (or changed) to another identifier (e.g., telephone number) other than the one the calling party is dialing from. Oftentimes, the spoofed identifier will be altered to resemble the receiving party's number so as to appear to originate in their locale. Spoofing involves choosing a caller ID that is not assigned to the caller, and the caller ID is often chosen to mimic the call location of the called number—for example, by matching the first three to six digits to the called number.

The disclosed framework provides novel systems and methods for increasing the accuracy and efficiency in tracking, identifying, blocking and preventing robocalls and robocallers. The disclosed systems and methods provide mechanisms for identifying and removing unwanted voice traffic from networks (e.g., Verizon® networks, for example). As discussed herein, according to some embodiments, the disclosed systems and methods compute voice traffic over a predetermined period of time (e.g., 1 day or 30 days, for example), and leverage this information into a customer knowledge score, e.g., a "know your customer" (KYC) score.

In some embodiments, as discussed below, the KYC score is based on data related to, but not limited to, total calls (also referred to as a volume of calls), n digit percent (e.g., percentage of calls where the originating and destination/terminating caller IDs matched by the first n digits), canceled percent (e.g., percent of calls that were disconnected by the originator), 404 percent (e.g., percentage of calls that called numbers that are not assigned (e.g., "not found"), "RoboScore" (e.g., a measure to indicate automation and unwantedness), "Spamness" score (e.g., percentage of the traffic with originations matching watchlist numbers (e.g., a provided by Transaction Network Services (TNS) Cequint®, for example)), honeypot scam counts (e.g., number of calls to a honeypot number(s) that were flagged as spam/scam calls), honeypot total calls (e.g., total number of calls to honeypot numbers), honeypot calls to toll free "8yy" numbers, external traceback requests (performed for USTELECOM or Industry Traceback Groups (ITGs) as part of a larger industry level investigation, internal traceback requests (e.g., Verizon® network traceback requests to investigate reported incidents), and the like, or some combination thereof.

The metrics that contribute to the KYC score are used because they indicate spoofing or malicious behavior. According to some embodiments, a high frequency of n percent matches is an indicator that the caller is either spoofing or renting numbers that are similar to call recipients' as a tactic to get call targets to answer. According to some embodiments, a high canceled percent reflects termination of calls before they route to voicemail to avoid additional charges. According to some embodiments, a high 404 percent indicates that callers do not know whether the recipient numbers are assigned, and are randomly choosing numbers to robocall.

According to some embodiments, as discussed below, a RoboScore is a measure of call automation incorporating metrics that indicate robocalls or spam calls (such as call duration, unanswered rate, volumes, and the like) into a single calculation. According to some embodiments, a high spamness score indicates that callers are using known robo origination numbers or spam origination numbers. According to some embodiments, honeypot call metrics signify that originators are calling destinations that are not assigned to a customer or business and therefore unlikely to be legitimate communications. According to some embodiments, traceback requests indicate that calls from that provider have been flagged, either externally or internally, as fraudulent, spam, or malicious in some way.

In some embodiments, the data that forms the basis for the KYC score can be specific to a type that can include, but is not limited to, a user (or subscriber and/or his/her account), grouping of users, and the like, or some combination thereof, as discussed below.

According to some embodiments, the KYC score can be leveraged to perform a task list that includes actions referred to as "notify", "clean up" and "take action", thereby enabling calls to be routed, re-routed, controlled and/or blocked as they are communicated over voice networks.

In some embodiments, alleged robocallers are notified of their activity based on their computed KYC score. This notification can alert them to impending action if they do not clean up their activity. In some embodiments, alleged robocallers must clean up their activity by preventing and/or halting future robocalls within a predetermined time period; and if they do not, then the disclosed framework will take action by, for example, throttling their voice and/or data usage availability, preventing them from make specific types of calls, and/or, in extreme cases, removing them from being capable of using the network. In some embodiments, the framework may throttle data/voice availability to a first degree for a first period of time, and then if the KYC score does not improve beyond a predetermined threshold value, then throttle the data/voice availability to a second degree. In these embodiments, the framework may or may not notify the alleged robocallers regarding their activity, allowing the framework to dynamically evaluate and achieve performance goals of the underlying network.

FIG. 1 is a block diagram of an example network architecture according to some embodiments of the present disclosure. In the illustrated embodiment, user equipment (UE) 102 accesses a data network 108 via an access network 104 and a core network 106. In the illustrated embodiment, UE 102 comprises any computing device capable of communicating with the access network 104. As examples, UE 102 may include mobile phones, tablets, laptops, sensors, Internet of Things (IoT) devices, autonomous machines, wired devices, wireless handsets, and any other devices equipped with a cellular or wireless or wired transceiver. One example of a UE is provided in FIG. 4.

In the illustrated embodiment, the access network 104 comprises a network allowing network communication with UE 102. In general, the access network 104 includes at least one base station that is communicatively coupled to the core network 106 and coupled to zero or more UE 102.

In some embodiments, the access network 104 comprises a cellular access network, for example, a fifth-generation (5G) network or a fourth-generation (4G) network. In one embodiment, the access network 104 and UE 102 comprise a NextGen Radio Access Network (NG-RAN). In an embodiment, the access network 104 includes a plurality of next Generation Node B (gNodeB) base stations connected to UE 102 via an air interface. In one embodiment, the air interface comprises a New Radio (NR) air interface. For example, in a 5G network, individual user devices can be communicatively coupled via an X2 interface.

In the illustrated embodiment, the access network 104 provides access to a core network 106 to the UE 102. In the illustrated embodiment, the core network may be owned and/or operated by a network operator (NO) and provides wireless connectivity to UE 102. In the illustrated embodiment, this connectivity may comprise voice and data services.

At a high-level, the core network 106 may include a user plane and a control plane. In one embodiment, the control plane comprises network elements and communications interfaces to allow for the management of user connections and sessions. By contrast, the user plane may comprise network elements and communications interfaces to transmit user data from UE 102 to elements of the core network 106 and to external network-attached elements in a data network 108 such as the Internet.

In the illustrated embodiment, the access network 104 and the core network 106 are operated by a NO. However, in some embodiments, the networks (104, 106) may be operated by a private entity and may be closed to public traffic. For example, the components of the network 106 may be provided as a single device, and the access network 104 may comprise a small form-factor base station. In these embodiments, the operator of the device can simulate a cellular network, and UE 102 can connect to this network similar to connecting to a national or regional network.

In some embodiments, the access network 104, core network 106 and data network 108 can be configured as a multi-access edge computing (MEC) network, where MEC or edge nodes are embodied as each UE 102, and are situated at the edge of a cellular network, for example, in a cellular base station or equivalent location. In general, the MEC or edge nodes may comprise UEs that comprise any computing device capable of responding to network requests from another UE 102 (referred to generally as a client) and is not intended to be limited to a specific hardware or software configuration a device.

FIG. 1 further includes robocall management engine 200. The robocall management engine 200 can be a special purpose machine or processor, and could be hosted by or integrated into functionality associated with access network 104, core network 106 and/or data network 108, or some combination thereof.

Figure 2:
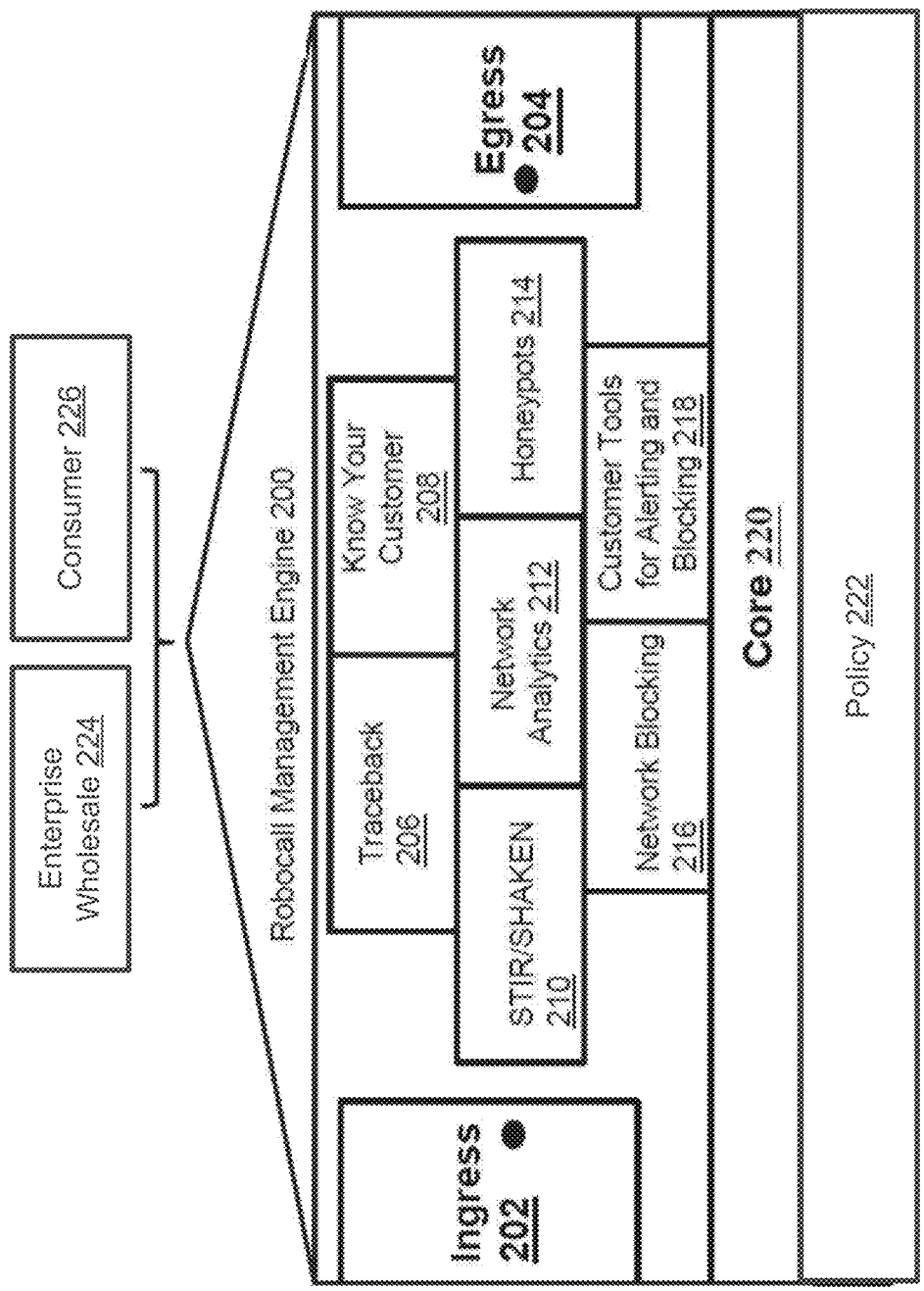
FIG. 2 is a block diagram of illustrating components of an exemplary system according to some embodiments of the present disclosure.

In some embodiments, as illustrated in FIG. 2, for example, engine 200 can be hosted on a 4G or 5G Core— item 220 (though other networks are also contemplated herein). In some embodiments, engine 200 can be in association with policy management components 222 for 4G/5G Cores (for example, Policy and Charging Rules Functions (PCRF) for 4G networks, and Policy Control Functions (PCF) for 5G networks), as illustrated in FIG. 2.

In some embodiments, engine 200 can be hosted by any type of network server, such as, but not limited to, an edge node or server, application server, content server, web server, third party server, user's computing device, and the like, or any combination thereof.

Turning to FIG. 2, detailed embodiments of robocall management engine 200 are depicted and disclosed herein with regard to components for performing the systems and methods discussed herein.

According to some embodiments, robocall management engine 200 can be located on a network server. According to some embodiments, robocall management engine 200 can be embodied as a stand-alone application that executes on a user device. In some embodiments, the robocall management engine 200 can function as an application installed on the user's device, and in some embodiments, such application can be a web-based application accessed by the user device over a network. In some embodiments, the robocall management engine 200 can be installed as an augmenting script, program or application (e.g., a plug-in or extension) to another application.

As illustrated in FIG. 2, according to some embodiments, robocall management engine 200 includes modules, sub-engines and/or controllers including, but not limited to: ingress component 202, egress component 204, traceback component 206, know your score component 208, STIR/SHAKEN component 210, network analytics component 212, honeypots component 214, network blocking component 216 and customer tools for alerting and blocking component 218. Each of engine 200's components (202-218) can be embodied as a module, sub-engine or controller, and act as a component of engine 200's configured operations, as discussed below.

According to some embodiments, ingress component 202 handles incoming calls or voice (e.g., cellular data) traffic for a network (e.g., a 5G cellular network, for example, as provided by 5G Core 220). Such traffic can be related to, but is not limited to, wholesaler traffic (or callers), international traffic, enterprise traffic, subscriber traffic and partner/provider traffic. The ingress component 200 is configured to accept incoming calls for the core 220.

According to some embodiments, the ingress component 202 captures the signals and/or data that is used for the KYC score, as discussed below in relation to FIG. 3. In some embodiments, ingress component 200 identifies the incoming data signal, and directs the signal to at least one of engine 200's other components, as discussed below. This signal/data relay enables call information to be identified, from which the KYC score is computed, as discussed below.

According to some embodiments, traceback component 206 captures data related to a number of tracebacks. Tracebacks involve tracing calls to their source or origin, which contributes to a metric for scoring. In some embodiments, tracebacks are triggered based on external complaints of scamming from other carriers, peers and/or customers. In some embodiments, tracebacks can be triggered automatically based on data related to a caller (e.g., caller ID used, location of call origination, and the like), call volume over a period of time by a caller and/or callers, and the like.

In some embodiments, tracebacks can be performed in accordance with, and triggered by, criteria and/or rules set by USTELECOM. In some embodiments, the USTELECOM traceback requests correspond to tracebacks where the caller and recipient of the call are using different voice-carrier networks. In some embodiments, tracebacks can be internal tracebacks. That is, for example, tracebacks conducted to trace reported incidents to the network source as part of an internal investigation.

According to some embodiments, Know Your Customer score component 208 operates in accordance with the "Know Your Customer score" legal requirement that is a sub-part of voice contracts. In some embodiments, the Know Your Customer score component 208 is configured with functionality for performing the KYC scoring discussed below in relation to FIG. 3.

According to some embodiments, STIR/SHAKEN component 210, where "STIR/SHAKEN" stands for "Secure Telephone Identity Revisited/Signature-based Handling of Asserted information using toKENs" is a technique for providing more reliable call-display information by closing loopholes that scammers can exploit in telephony infrastructures. In general, STIR/SHAKEN component 210 simplifies the process of tracing a call back to its source.

According to some embodiments, STIR/SHAKEN component 210 operates as a suite of protocols and procedures intended to combat caller ID spoofing on public telephone networks. The STIR portion of STIR/SHAKEN component 210 is defined as a series of request for comments (RFC) standards documents by a Working Group of the Internet Engineering Task Force (IETF). STIR system operates by adding a digital certificate to the Session Initiation Protocol (SIP) information used to initiate and route calls in VoIP systems. In some embodiments, the first public connection on a network, typically the VoIP service provider, based on certain criteria, attaches an encrypted certificate to the SIP header with the service provider's identity and a trust value. VoIP software on the receiving end can check the authenticity of the message by decrypting STIR data using the provider's public key.

For non-VoIP systems, call routing information is carried by Signaling System 7 (SS7), which is an international telecommunications standard. In these cases, the SIP header is not directly useful as it cannot be sent to users unless they are on a VoIP connection. This is the purpose of the SHAKEN system. SHAKEN is a suite of guidelines for public switched telephone networks that indicate how to deal with calls that have incorrect or missing STIR information. This may be in the form of additional information in the caller name (CNAM) information of caller ID indicating the number has been spoofed.

According to some embodiments, network analytics component 212 analyzes the incoming call data received at or by ingress component 202, and calculates metrics related to network traffic, activity and the like, which can be overall network consumption data and/or individual data particular to a class or type of user or specifically tracked users. For example, network analytics component 212 can track and determine, but is not limited to, total calls, call volume for a period of time, call frequency for caller IDs, number/percentage of canceled calls, number/percentage of spam calls, a number/percent of n-digits (e.g., 3-digit matches, 4-digit matches, and the like), honeypot data, and the like, or some combination thereof.

According to some embodiments, honeypots component 214 is utilized by engine 200 to mimic likely targets of scammers/spammers. Honeypots component 214 is a telephone endpoint to which calls can be directed. It may appear to callers to be a normal telephone number (e.g., a typical 10-digit residential or business phone number), but is specifically designed and deployed to collect information on unwanted calls. In some embodiments, honeypots component 214 can automatically monitor and record incoming calls to the designated destination number(s). The data collected by honeypots component 214 can be analyzed by network analytics component 212, as discussed above.

In some embodiments, honeypots component 214 is built out, established and implemented based on information provided by a telecommunications service provider (TSP— for example, Verizon®) that relates to, but is not limited to, phone numbers, call routing, call data records and/or backtrace information, and the like. In some embodiments, honeypots component 214 can be hosted inside or outside of TSP networks; for example, in a Private Branch Exchange (PBX). In some embodiments, low cost Internet call routing to a PBX may be implemented using VoIP communications. In some embodiments, a host PBX may be constructed using software-based solutions that provide call processing functionality, and server applications to accept, route, interact and log the incoming connections.

According to some embodiments, honeypots component 214 can utilize several different types of phone numbers, as discussed above. For example, types of numbers that can be used by a honeypot can include, but are not limited to: i) numbers that have never been assigned (e.g., new area codes or NXXs within an area code; or complete new NXXs may also be provided); ii) reused/recycled phone numbers that are not assigned and are of varying issue date (e.g., older numbers are more valuable as they demonstrate a long term billing address; other reused phone numbers with specific attributes that TSPs can provide); iii) "dirty" numbers (e.g., numbers which have been given up by customers of a TSP or a service provider because of a significantly high number of unsolicited incoming calls); iv) commercial phone numbers (e.g., retirement homes); v) governmental phone numbers (e.g., discontinued governmental phone numbers); vi) sequencing of numbers can also be of value to discover sequential dialers and the range of impact of specific ADAD (Automatic Dialing-Announcing Device) campaigns; and vii) toll free "8yy" numbers.

In some embodiments, honeypots component 214 can execute known or to be known speech-to-text algorithms (e.g., Natural Language Processing (NLP)) on received calls. This can result in a transcription. In some embodiments, the transcription can be analyzed, and a determination can be made whether the context of the call indicates that a spam call has been realized. In some embodiments, such analysis and determination can be performed using any known or to be known analysis technique, including, but not limited to, neural networks (e.g., convolutional neural networks), computer vision, data mining, and the like, or some combination thereof.

For example, a sample text of a typical spam call is as follows: "Hi, this is Kelly Jones calling you from the Department of Social Security Administration. The reason you have received a phone call from our department is to inform you that a legal enforcement action has been filed on your social security number for fraudulent activity, so when you get this message kindly call us back on our hotline number XXX-XXX-XXXX or your social security number will be canceled."

Analysis of this type of message would indicate that it is a spam call for a number of factors; for example, social security numbers are not cancelable, the department mentioned in the call, as well as other government agencies, do not "threaten" or advise you of legal actions by telephone, nor do they advise you of any activity by telephone. Thus, the caller ID, and other call data would be stored in either database 224 and/or 226 (as discussed below, depending on a type of caller), and the honeypot component 214 data would be collected accordingly.

In some embodiments, honeypots component 214 can include separate or individual honeypots that collect data for specific types of spam calls. For example, honeypots component 214 can include a set of portions, segmented or distributed data structures that collect and store information related to types of spam calls. For example, such spam calls can be in regard to, but are not limited to, car insurance, car warranty, computer accounts, credit cards, employment, health insurance, medical alerts, Medicare, rebates, Social Security Administration (SSA, as discussed above), student loans, travel and utilities, and the like, or some combination thereof. It is well known that this list is not exhaustive, and is only to provide a sampling of the types of platforms robocallers can utilize to trick unassuming call recipients.

According to some embodiments, network blocking component 216 corresponds to traffic received by ingress component 202 related to, but not limited to, filtered calls, blocked distribution network operators (DNO), invalid telephone numbers (TNs), tagged spam calls, and the like, or some combination thereof. In some embodiments, functionality of network blocking component 216 can be implemented as a result of the KYC score discussed below in relation to FIG. 3. For example, network blocking component 216 can direct engine 200 to implement STIR/SHAKEN component 210, throttle network activity of an account, and/or remove an account entirely, and the like.

According to some embodiments, customer tools for alerting and blocking component 218 is configured to provide users with capabilities for receiving alerts of incoming potential spam and/or enabling the users to implement blocking technology. In some embodiments, such tools can be provided to users over a network and/or at or on users' devices. In some embodiments, component 218 can include, but is not limited to, spam filters provided by a service provider, SMS messages or other forms of notifications that can serve as alerts, applications for call blocking and identification, and the like.

According to some embodiments, egress component 204 is configured to process the traffic received from the ingress 200 according to the computed KYC score, as discussed in more detail below in relation to FIG. 3. Egress component 204, based on the computations performed by each of the components of engine 200, can, but is not limited to, rollout a filter to screen and prevent unwanted calls, restrict network usage by a type of user or specific users, apply STIR/SHAKEN component 210, silence identified "junk" callers, modify inbound calls to display company name identifiers, and perform network blocking (e.g., block invalid DNOs, restricting or preventing use of certain TNs, for example). In some embodiments, such functionality can be provided by components 216 and/or 218.

According to some embodiments, engine 200 is connected to databases 224 and 226. In some embodiments, database 224 stores enterprise network data and database 226 stores user (or subscriber) data. Databases 224 and 226 can be any type of database or memory. Databases 224 and 226 comprise a dataset of data and metadata associated with local and/or network traffic information related to enterprises, users, services, applications, content and the like. While databases 224 and 226 are displayed as separate databases, this should not be construed as limiting; in some embodiments databases 224 and 226 can be embodied as a single database (e.g., a multidimensional database, for example), and in some embodiments, a set of databases can be utilized for each respective database 224 and 226.

Figure 3:
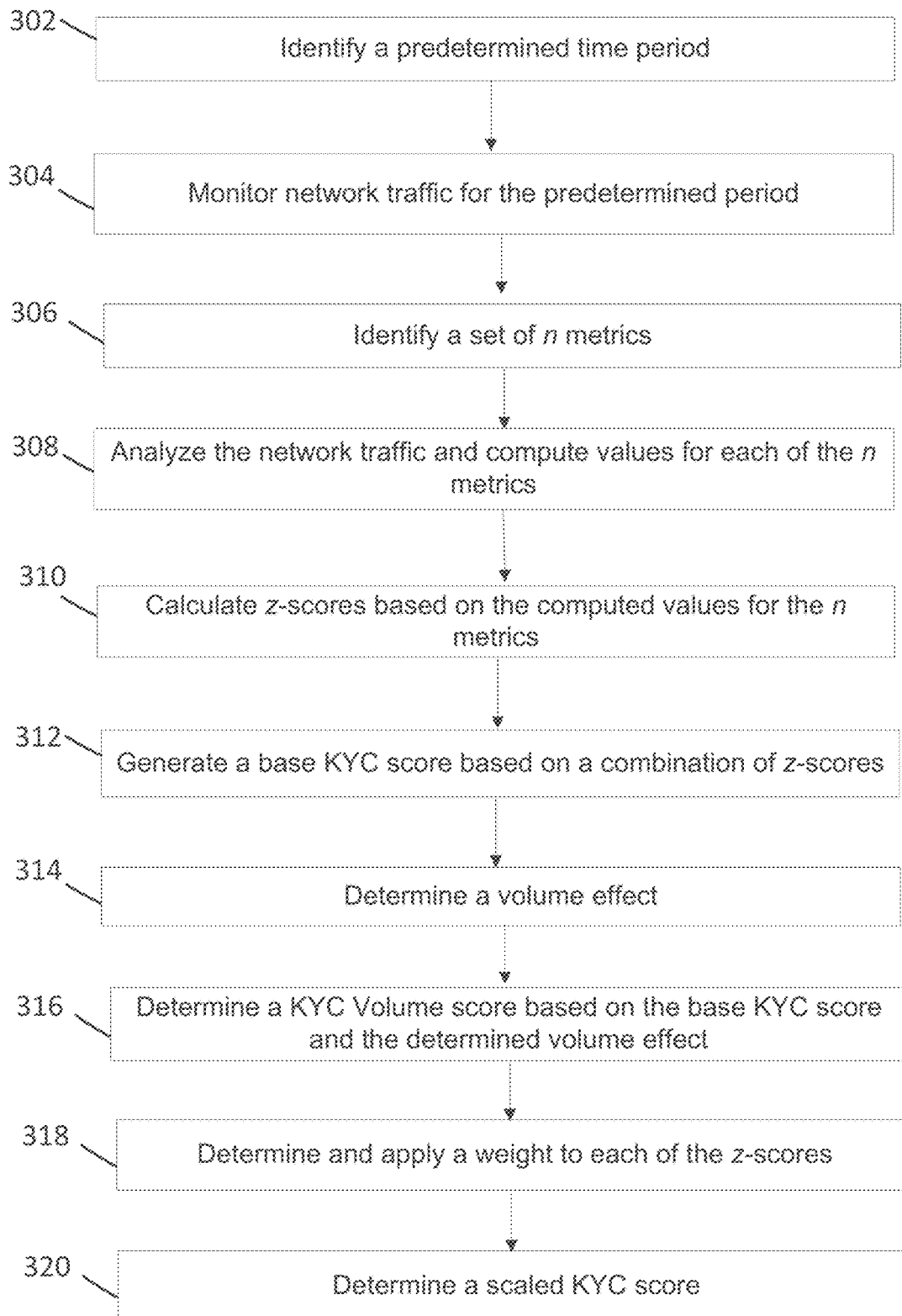
FIG. 3 illustrates an exemplary data flow according to some embodiments of the present disclosure.

Turning to FIG. 3, Process 300 details non-limiting example embodiments for determining a KYC score for callers (e.g., individual callers, types/categories of callers, and the like) that can be leveraged to block and/or track the callers and/or the numbers that are being used to combat unwanted voice traffic over a network.

Process 300 begins with Step 302 where a predetermined time period for computing the KYC score is identified (or is set). For example, a time period of 30 days can be utilized. In some embodiments, the time period (e.g., 30 days) can be set at least a certain length in order to provide an ample term for determining current robocall and Spamness activity trends while accounting and filtering for anomalous bursts of bad traffic.

The following steps of Process 300 are performed with regard to the identified time period of Step 302. For exemplary purposes, 30 days will be utilized as a non-limiting example embodiment; however, it should be understood that 30 days is not limiting, as any time period can be utilized, as discussed above, without departing from the scope of the instant disclosure.

In some embodiments, at the conclusion of the 30 day period, Process 300 can recursively loop back to Step 302 (e.g., from Step 320) in order to continue monitoring and tracking activity for purposes of recalculating an updated KYC score to address currently observed robocall and Spamness trends.

In Step 304, network traffic for the predetermined period of time is monitored. Such monitoring includes, but is not limited to, analyzing and identifying information related to, but not limited to, a calling party's ID, origination location of calls, NAP of incoming calls, NAP of destination ID, location of destination calls, recipient party's ID, and the like, or some combination thereof. The ID for the calling party and recipient party can refer to information related to, but not limited to, a TN, name, company, city, town, state, country, and the like, or some combination thereof.

In some embodiments, the monitoring and subsequent analysis performed with respect to Step 304 (and the subsequent steps that gather and determine information based on the monitoring) can be performed utilizing any known or to be known AI or machine learning algorithm, model or mechanism that identifies types of data, and determines their associated values, such as, but not limiting to, computer vision, neural networks, data mining, data extraction, data classifiers, and the like, or some combination thereof.

In Step 306, a set of n metrics are identified. The metrics correspond to a type of data that is to be collected from the network traffic monitored during the predetermined time period.

According to some embodiments, as discussed above, the type of data can be related to, but is not limited to, total calls, n digit percent (e.g., percent of calls where the first n digits of the originating and destination or recipient caller IDs match), canceled percent of calls, 404 percent of calls, RoboScore (as discussed below), Spamness score, honeypot scam counts, honeypot total calls, honeypot calls to toll free "8yy" numbers, USTELECOM traceback requests, internal traceback requests, and the like, or some combination thereof.

In some embodiments, the metrics can be pre-assigned, pre-determined or pre-selected. In some embodiments, the types of metrics can be dynamically determined based on the detected network activity. For example, if engine 200 observes a threshold satisfying number of "5 digit percent" calls occurring, then this metric can be automatically set to be checked for and tabulated accordingly (and used as part of the KYC scoring discussed below). Thus, the monitoring in Step 304 and the subsequent steps of Process 300 can be modified and/or configured according to observed network traffic.

In some embodiments, a threshold number of metrics can be evaluated (e.g., a set of at least 5 metrics), so as to provide a certain amount of data that ensures particular callers, caller IDs and network activity are tracked appropriately.

In some embodiments, the metrics can correspond to individual types of callers or a set of caller types, such as, but not limited to, wholesalers, international callers, enterprise callers, individual subscribers, and/or partner/providers, and the like, as discussed above. Thus, as discussed below, KYC scores can be determined for a type of caller, individual callers, groups of callers, and the like.

In Step 308, engine 200 analyzes the network traffic (e.g., processed through the ingress component 202, as discussed above in relation to FIG. 2), and computes values for each of the n metrics (from Step 306). In some embodiments, the computations can be based on analysis from the AI and/or machine learning analysis algorithms and models mentioned above.

By way of a non-limiting example of a metric computation, for metric RoboScore, the analysis and computation can be performed according to the following operations. As mentioned above, a RoboScore encapsulates call metrics indicative of robocalling behaviors (e.g., automation and "unwantedness"). The following example provides a non-limiting example embodiment of a RoboScore based on call duration and unanswered rate.

The process involves determining an average call duration and the rate at which calls are answered (for the predetermined time period—e.g., 30 days). These data values are then transformed to a normal distribution (e.g., normalized). For example, the average call duration value can be subject to a log transformation; and, the unanswered rate value can be subject to a cube root computation.

In some embodiments, these distributions can then be standardized so that the mean approximates to a predetermined value (e.g., 0) and the standard deviation approximates to a different predetermined value (e.g., 1). For example, in some embodiments, to standardize the metrics, the mean can be subtracted, whereby this number can be divided by the standard deviation to find the z-score.

According to some embodiments, for example, the mean and standard deviation for the normalized average call duration for a subset or for all caller types on the network are calculated. Then, the standardized average call duration can be computed by subtracting the overall mean from the entity's normalized average call duration, and that result can be divided by the overall standard deviation. In some embodiments, for the standardized average call duration, a factor of −1 can be multiplied so that higher values can be correlated to robocalling behavior for both metrics. This provides a standardized RoboScore value for average call duration.

According to some embodiments, for example, to standardize the unanswered rate, the mean and standard deviation can be computed for the normalized unanswered rates for a subset or for all caller types in the network. Then, to compute the standardized unanswered rate for a caller type, the overall mean can be subtracted from the normalized unanswered rate for that caller type, and that value can be divided by the overall standard deviation. This provides a standardized RoboScore value for unanswered rate of calls.

Thus, Step 308 provides metric values for each of the data types (e.g. for each of the n metrics identified in Step 306).

In Step 310, z-scores are calculated for the computed values of the n metrics. In some embodiments, z-scores are calculated (or determined) by engine 200 normalizing the disparate scores (or count values) from the n metrics (from Step 308) into a common scale. In some embodiments, the common scale ensures that the values are within a range of each other while maintaining the indication of activity-level for each type of metric.

In Step 312, a base KYC score is generated based on a combination of the z-scores. In some embodiments, the base KYC score is a summation of the z-scores (e.g., the scaled values of the n metrics).

In Step 314, a volume effect is determined. The determination in Step 314 involves analyzing the n metric values, and identifying a configurable exponent via exponential linear analysis, for example. The configurable exponent enables identification and prioritization of particular types of information. For example, a configurable exponent of total calls for the predetermined period is determined, which enables the identification and prioritization of high volume robocallers (e.g., callers that called honeypots a threshold satisfying number of times).

In Step 316, a KYC Volume score is determined based on the base KYC score and the determined volume effect. In some embodiments, Step 316 involves multiplying the volume effect value and the base KYC score.

In Step 318, a weight is determined and is applied to each of the z-scores involved in the KYC volume score. For example, external values may be weighted higher than internal values. Thus, for example, USTELECOM traceback data can be weighted more than internal traceback data.

In Step 320, a scaled KYC score is determined. This determination is based on the weighting of the z-scores of the KYC Volume score. In some embodiments, the scaled KYC score can be scaled to a value set or range—for example: zero to one [0,1]. The scaling ensures that the KYC scores are within a range of each other while maintaining the indication of activity for each type of caller/metric. Thus, the scaled KYC score provides a scaled value that represents robocalling activity for the predetermined period.

In some embodiments, as mentioned above, the scaled KYC score provides engine 200 with a basis for controlling network traffic by either blocking (e.g., stopping such calls via application of call blocking applications, for example), limiting (e.g., throttling) and/or identifying and tracking callers on the network. In some embodiments, these capabilities can be implemented by egress component 204, as discussed above.

In some embodiments, the scaled KYC score can be compared to a threshold value that indicates malicious activity. In some embodiments, a deviation of a certain degree from the threshold value can indicate what type of control is implemented. For example, if a caller's scaled KYC score is above the threshold by more than a predetermined number, then rather than limiting the user's account or providing a notice, the user's account may be removed entirely due to the activity being at a level that is too egregious to expect it to be tempered.

Thus, in some embodiments, the scaled KYC score can be utilized to identify "unwanted" activity and/or "bad" actors, and address the activity accordingly. For example, as discussed above, a caller that has a scaled KYC scaled score at or above a threshold level (e.g., based on callers that have called a honeypot number a threshold amount of times during a time period), can receive a notification to stop such activity. If continued monitoring (e.g., Steps 304-308) results in detection of a similar scaled KYC score for that caller (for similar activity), then the caller can have his/her account subject to action that restricts and/or limits their network activity. For example, data bandwidth can be throttled. In another example, the caller ID can be added to a blacklist. In another example, the call may have his/her account banned, which would cause the caller and his/her account removed from the network.

Figure 4:
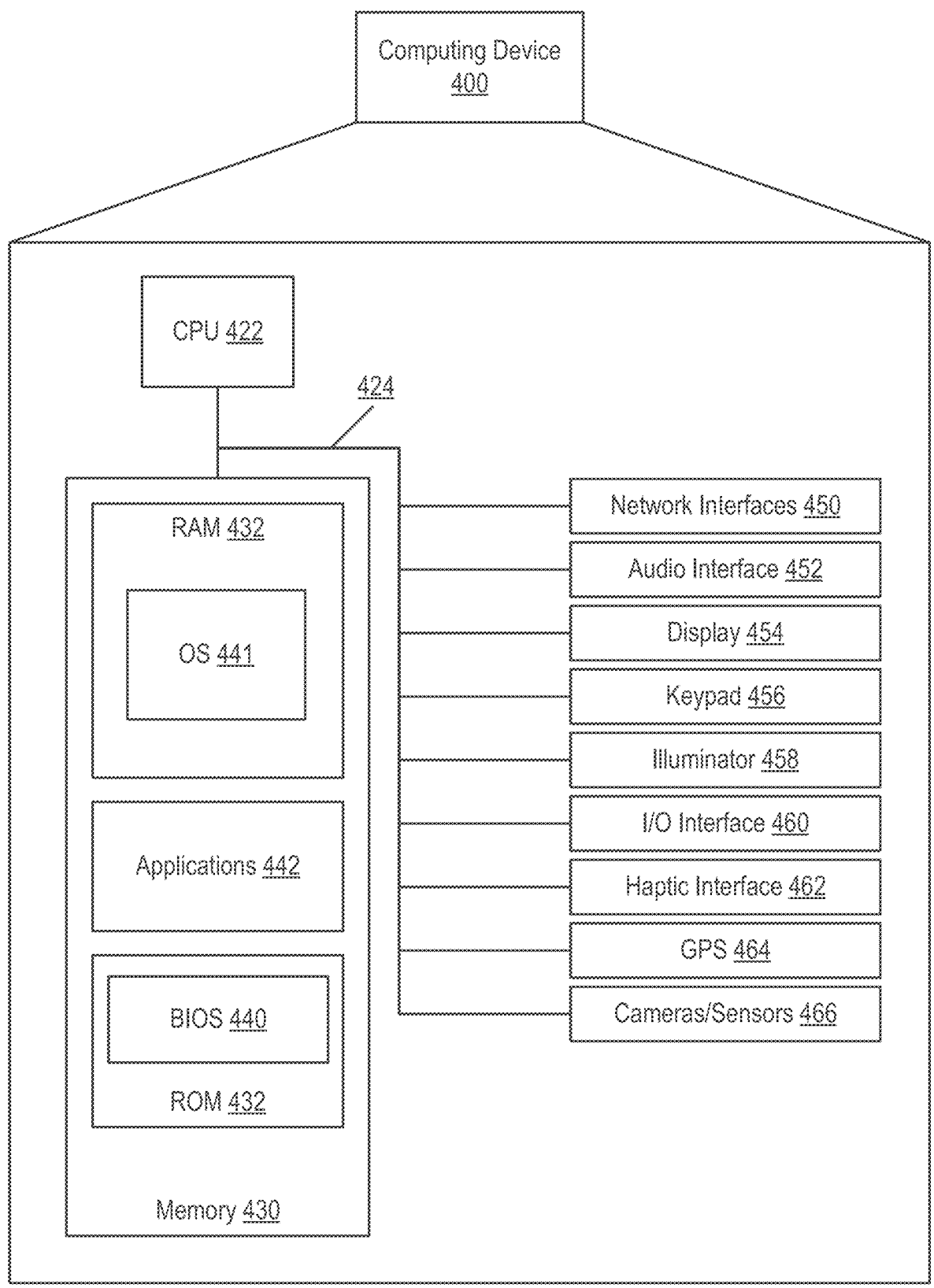
FIG. 4 is a block diagram illustrating a computing device showing an example of a client or server device used in various embodiments of the present disclosure.

FIG. 4 is a block diagram illustrating a computing device showing an example of a client or server device used in the various embodiments of the disclosure.

The computing device 400 may include more or fewer components than those shown in FIG. 4, depending on the deployment or usage of the device 400. For example, a server computing device, such as a rack-mounted server, may not include audio interfaces 452, displays 454, keypads 456, illuminators 458, haptic interfaces 462, GPS receivers 464, or cameras/sensors 466. Some devices may include additional components not shown, such as graphics processing unit (GPU) devices, cryptographic co-processors, artificial intelligence (AI) accelerators, or other peripheral devices.

As shown in FIG. 4, the device 400 includes a central processing unit (CPU) 422 in communication with a mass memory 430 via a bus 424. The computing device 400 also includes one or more network interfaces 450, an audio interface 452, a display 454, a keypad 456, an illuminator 458, an input/output interface 460, a haptic interface 462, an optional global positioning systems (GPS) receiver 464 and a camera(s) or other optical, thermal, or electromagnetic sensors 466. Device 400 can include one camera/sensor 466 or a plurality of cameras/sensors 466. The positioning of the camera(s)/sensor(s) 466 on the device 400 can change per device 400 model, per device 400 capabilities, and the like, or some combination thereof.

In some embodiments, the CPU 422 may comprise a general-purpose CPU. The CPU 422 may comprise a single-core or multiple-core CPU. The CPU 422 may comprise a system-on-a-chip (SoC) or a similar embedded system. In some embodiments, a GPU may be used in place of, or in combination with, a CPU 422. Mass memory 430 may comprise a dynamic random-access memory (DRAM) device, a static random-access memory device (SRAM), or a Flash (e.g., NAND Flash) memory device. In some embodiments, mass memory 430 may comprise a combination of such memory types. In one embodiment, the bus 424 may comprise a Peripheral Component Interconnect Express (PCIe) bus. In some embodiments, the bus 424 may comprise multiple busses instead of a single bus.

Mass memory 430 illustrates another example of computer storage media for the storage of information such as computer-readable instructions, data structures, program modules, or other data. Mass memory 430 stores a basic input/output system ("BIOS") 440 for controlling the low-level operation of the computing device 400. The mass memory also stores an operating system 441 for controlling the operation of the computing device 400.

Applications 442 may include computer-executable instructions which, when executed by the computing device 400, perform any of the methods (or portions of the methods) described previously in the description of the preceding Figures. In some embodiments, the software or programs implementing the method embodiments can be read from a hard disk drive (not illustrated) and temporarily stored in RAM 432 by CPU 422. CPU 422 may then read the software or data from RAM 432, process them, and store them to RAM 432 again.

The computing device 400 may optionally communicate with a base station (not shown) or directly with another computing device. Network interface 450 is sometimes known as a transceiver, transceiving device, or network interface card (NIC).

The audio interface 452 produces and receives audio signals such as the sound of a human voice. For example, the audio interface 452 may be coupled to a speaker and microphone (not shown) to enable telecommunication with others or generate an audio acknowledgment for some action. Display 454 may be a liquid crystal display (LCD), gas plasma, light-emitting diode (LED), or any other type of display used with a computing device. Display 454 may also include a touch-sensitive screen arranged to receive input from an object such as a stylus or a digit from a human hand.

Keypad 456 may comprise any input device arranged to receive input from a user. Illuminator 458 may provide a status indication or provide light.

The computing device 400 also comprises an input/output interface 460 for communicating with external devices, using communication technologies, such as USB, infrared, Bluetooth™, or the like. The haptic interface 462 provides tactile feedback to a user of the client device.

The optional GPS transceiver 464 can determine the physical coordinates of the computing device 400 on the surface of the Earth, which typically outputs a location as latitude and longitude values. GPS transceiver 464 can also employ other geo-positioning mechanisms, including, but not limited to, triangulation, assisted GPS (AGPS), E-OTD, CI, SM, ETA, BSS, or the like, to further determine the physical location of the computing device 400 on the surface of the Earth. In one embodiment, however, the computing device 400 may communicate through other components, provide other information that may be employed to determine a physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

To the extent the aforementioned implementations collect, store, or employ personal information of individuals, groups, or other entities, it should be understood that such information shall be used in accordance with all applicable laws concerning the protection of personal information. Additionally, the collection, storage, and use of such information can be subject to the consent of the individual to such activity, for example, through well known "opt-in" or "opt-out" processes as can be appropriate for the situation and type of information. Storage and use of personal information can be in an appropriately secure manner reflective of the type of information, for example, through various access control, encryption, and anonymization techniques (for especially sensitive information).

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

What is claimed is:

1. A method comprising:
   monitoring, by a device, traffic data related to caller traffic occurring over a network for a predetermined period of time;
   analyzing, by the device, based on the monitoring, the traffic data, and identifying a set of metrics, each of the metrics in the set of metrics corresponding to type of activity observed by the network monitoring;
   computing, by the device, values for each of the metrics in the set of metrics;
   determining, by the device, a normalized value for each of the metrics values;
   determining, by the device, a base score for the predetermined period of time based on the normalized values;
   determining, by the device, a volume score based on the base score and a volume effect of the base score;
   determining, by the device, a weight for each normalized value;
   determining, by the device, a scaled score based at least on the volume score and the weighting of each normalized value; and
   controlling, by the device, over the network, incoming calls based on the scaled score, the control comprising functionality for at least one of blocking and limiting unsolicited caller activity on the network.

2. The method of claim 1, wherein the control is based on a comparison to the scaled score against a threshold value that indicates malicious activity on the network.

3. The method of claim 1, wherein the traffic data corresponds to a type of caller.

4. The method of claim 2, wherein the type of caller is at least one of a wholesaler, international caller, enterprise caller, partner, provider and subscriber.

5. The method of claim 1, wherein the type of activity associated with the set of metrics is selected from a group consisting of: total number of calls, n digit percent, canceled percent, 404 percent, RoboScore, Spamness score, honeypot scam counts, honeypot total calls, honeypot calls to toll free numbers, external traceback requests, and internal traceback requests.

6. The method of claim 5, wherein computed metrics for the n digit percent correspond to a percentage of calls where originating and destination caller IDs match.

7. The method of claim 5, wherein computed metrics for the canceled percent correspond to a percent of calls that were disconnected by an originator.

8. The method of claim 5, wherein computed metrics for the 404 percent correspond to a percentage of calls that called numbers that are not assigned.

9. The method of claim 5, wherein computed metrics for the RoboScore indicate a measure of call automation based on call behaviors, wherein the RoboScore call metrics are subject to normalization and standardization.

10. The method of claim 9, wherein call behaviors are based on a least one of call duration, unanswered rate and volume of calls.

11. The method of claim 5, wherein computed metrics for the Spamness score correspond to a percentage of the caller traffic with originations matching watchlist numbers.

12. The method of claim 5, wherein computed metrics for the honeypot scam counts indicate a number of calls to a honeypot number that was flagged as a spam call.

13. The method of claim 5, wherein computed metrics for the honeypot total calls indicate a total number of calls to honeypot numbers.

14. The method of claim 5, wherein computed metrics for the honeypot calls to toll free numbers indicate a number of calls to toll free numbers associated with a honeypot.

15. The method of claim 5, wherein computed metrics for the external traceback requests indicates a number of traceback requests that involve callers outside the network.

16. The method of claim 5, wherein computed metrics for the internal traceback requests indicate a number of traceback requests that involve callers associated with the network.

17. The method of claim 1, wherein the volume effect is based on a configurable exponent of at least one of the metrics values.

18. The method of claim 1, wherein steps of the method repeat at a conclusion of the predetermined time period for another time period.

19. A device comprising:
a processor configured to:
monitor traffic data related to caller traffic occurring over a network for a predetermined period of time;
analyze, based on the monitoring, the traffic data, and identify a set of metrics, each of the metrics in the set of metrics corresponding to type of activity observed by the network monitoring;
compute values for each of the metrics in the set of metrics;
determine a normalized value for each of the metrics values;
determine a base score for the predetermined period of time based on the normalized values;
determine a volume score based on the base score and a volume effect of the base score;
determine a weight for each normalized value;
determine a scaled score based at least on the volume score and the weighting of each normalized value; and
control, over the network, incoming calls based on the scaled score, the control comprising functionality for at least one of blocking and limiting unsolicited caller activity on the network.

20. A non-transitory computer-readable medium tangibly encoded with instructions, that when executed by a processor of a device, perform a method comprising:
monitoring, by the device, traffic data related to caller traffic occurring over a network for a predetermined period of time;
analyzing, by the device, based the on monitoring, the traffic data, and identifying a set of metrics, each of the metrics in the set of metrics corresponding to type of activity observed by the network monitoring;
computing, by the device, values for each of the metrics in the set of metrics;
determining, by the device, a normalized value for each of the metrics values;
determining, by the device, a base score for the predetermined period of time based on the normalized values;
determining, by the device, a volume score based on the base score and a volume effect of the base score;
determining, by the device, a weight for each normalized value;
determining, by the device, a scaled score based at least on the volume score and the weighting of each normalized value; and
controlling, by the device, over the network, incoming calls based on the scaled score, the control comprising functionality for at least one of blocking and limiting unsolicited caller activity on the network.

* * * * *